US008479302B1

(12) United States Patent
Lin (10) Patent No.: US 8,479,302 B1
(45) Date of Patent: Jul. 2, 2013

(54) ACCESS CONTROL VIA ORGANIZATION CHARTS

(75) Inventor: Derek Lin, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 158 days.

(21) Appl. No.: 13/036,174

(22) Filed: Feb. 28, 2011

(51) Int. Cl.
*G06F 21/00* (2006.01)

(52) U.S. Cl.
USPC ...... 726/28; 726/5; 726/7; 713/168; 713/189; 380/44; 705/52; 705/54; 455/414.1; 709/204; 709/226

(58) Field of Classification Search
USPC ...................................................... 726/3, 28
See application file for complete search history.

(56) References Cited

U.S. PATENT DOCUMENTS

| 6,223,985 | B1 | 5/2001 | DeLude | |
|---|---|---|---|---|
| 6,275,825 | B1 * | 8/2001 | Kobayashi et al. | 707/737 |
| 7,627,900 | B1 * | 12/2009 | Noel et al. | 726/25 |
| 7,757,277 | B2 * | 7/2010 | Haugh | 726/7 |
| 2008/0072290 | A1 * | 3/2008 | Metzer et al. | 726/3 |
| 2008/0120302 | A1 * | 5/2008 | Thompson et al. | 707/9 |
| 2008/0168530 | A1 * | 7/2008 | Kuehr-McLaren et al. | 726/1 |
| 2008/0307498 | A1 * | 12/2008 | Johnson et al. | 726/3 |
| 2009/0271863 | A1 * | 10/2009 | Govindavajhala et al. | 726/23 |
| 2009/0288150 | A1 * | 11/2009 | Toomim et al. | 726/5 |
| 2010/0162350 | A1 * | 6/2010 | Jeong et al. | 726/1 |
| 2011/0004927 | A1 * | 1/2011 | Zlowodzki | 726/7 |
| 2012/0110670 | A1 * | 5/2012 | Mont et al. | 726/25 |

OTHER PUBLICATIONS

Sandhu et al., "RolemBased Access Control Models", Computer, Date of Publication: Feb. 1996, vol. 29 , Issue: 2 pp. 38-47.*
Bauer et al., "Real Life Challenges in Access-Control Management," CHI 2009, 10 pages.

* cited by examiner

*Primary Examiner* — Morshed Mehedi
(74) *Attorney, Agent, or Firm* — BainwoodHaung (57) ABSTRACT

Improved techniques involve controlling access to data based on who has previously accessed the data. For example, when a user submits a request to access a resource, a list of those users who have accessed the resource is generated. Identifiers associated with the requesting user and the accessing users from the list of users are located within an organization chart which contains information about the hierarchal level and department to which users within the organization belong. As an example, if the requesting user is an executive-level employee and the accessing users are also executive-level users, then access to the resource is granted. If, on the other hand, the requesting user is on the level of an individual contributor, or a contractor, then access to the resource is denied. Further, access requests can be recorded in the access log for tracking.

20 Claims, 5 Drawing Sheets

| Accessing User Identifier | Access Allowed? |
|---|---|
| User Aa | Yes |
| User B | Yes |
| User A22 | No |
| User A24 | No |
| User B13 | Yes |
| User B23 | No |

ACCESS CONTROL VIA ORGANIZATION CHARTS

BACKGROUND

Some computers impose access privileges on files. In a conventional approach, each file has an access class and each user has an access privilege which are manually set to specific values or automatically set to default settings. For example, an access control program running on a computer allows a user having a first type of access privilege to access the contents of the file having a first access class while the access control program denies, to the user having a second type of access privilege, access to the contents of the files having the first access class. Further, the access control program denies, to the user having the first type of access privilege, access to the contents of the files having a second access class.

Some computers are equipped with data loss prevent (DLP) software. The DLP software typically scans data within the files for data fitting certain sensitive data formats (e.g., credit card numbers, social security numbers, etc.). The DLP software can then flag or restrict access to any files containing these sensitive data formats.

SUMMARY

Unfortunately, there are deficiencies associated with the above-described conventional approaches to controlling access to data. For example, the above-described conventional file access control approach requires access classes and access privileges to be manually set to specific values or automatically set to default settings regardless of the situation. However, such operation is completely unrelated to whether the content with the files is sensitive.

Additionally, conventional DLP software requires scanning the actual content within the files. Such operation requires opening each file and reading the data within that file and may require significant processing time. Further, it is difficult to identify critical content from documents which contain non-textual content such as image files, video files, sound files, executable applications, disk drives and VM images.

Another example of a deficiency with the above-described conventional approaches is that there is no capacity within the policies to track access attempts for unusual access. That is, the policies are designed to control access based upon content without taking into account dynamic user behaviors which could signal additional security risks or inconvenience users by unnecessarily denying access. In contrast to the above-described conventional approaches to controlling access to data, improved techniques involve controlling access to data based on users who have previously accessed the data and patterns of data access from the users. For example, when a user submits a request to access a resource, a list of those users who have accessed the resource is generated. Identifiers associated with the requesting user and the accessing users from the list of users are located within an organization chart which contains information about the hierarchal level and department to which users within the organization belong. As an example, if the requesting user is an executive-level employee and the previous accessing users are also executive-level users who primarily shared the resource amongst themselves, then access to the resource is granted. If, on the other hand, the requesting user is on the level of an individual contributor who also is not known to shared resources accessed by executive-level users who accessed the requested resources, then access to the resource is denied. Further, access requests can be recorded in the access log for tracking. Accordingly, no opening of files and reading of their content is required.

It should be understood that, in some arrangements, individual or aggregate access patterns of previous users accessing the resource are dynamically learned beforehand. The identifiers and the learned patterns are used to grant, challenge, or deny access to the requesting user.

One embodiment of the improved technique is directed to a method of controlling access to a resource. The method includes receiving, from a requesting user, a request to access the resource, the request having a requesting identifier which identifies the requesting user among a set of organization users. The method also includes locating a security classification associated with the requesting identifier of the request in response to receiving the request from the requesting user. The method further includes performing an access control operation which provides, to the requesting user, access to the resource when the security classification satisfies a security class requirement and denies, to the requesting user, access to the resource when the security classification does not satisfy the security class requirement, the security class requirement being derived from access information defined by prior accesses to the resource by other organization users of the set of organization users.

Additionally, some embodiments of the improved technique are directed to a system configured to control access to a resource. The system includes a network interface coupled to a network, a memory and a processor coupled to the memory, the processor configured to carry out the method of controlling access to a resource.

Furthermore, some embodiments of the improved technique are directed to a computer program product having a non-transitory computer readable storage medium which stores code including a set of instructions to carry out the method of controlling access to a resource.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Improved techniques involve controlling access to data based on who has previously accessed the data. For example, when a user submits a request to access a resource, a list of those users who have accessed the resource is generated. Identifiers associated with the requesting user and the accessing users from the list of users are located within an organization chart which contains information about the hierarchal level and department to which users within the organization belong. As an example, if the requesting user is an executive-level employee and the accessing users are also executive-level users, then access to the resource is granted. If, on the other hand, the requesting user is on the level of an individual contributor, or a contractor, then access to the resource is denied. In cases less clear-cut, access to the resource may be challenged; that is, additional action will be required in order to make a decision to grant or deny access to the resource. Further, access requests can be recorded in the access log for tracking. Accordingly, no opening of files and reading of their content is required.

Figure 1:
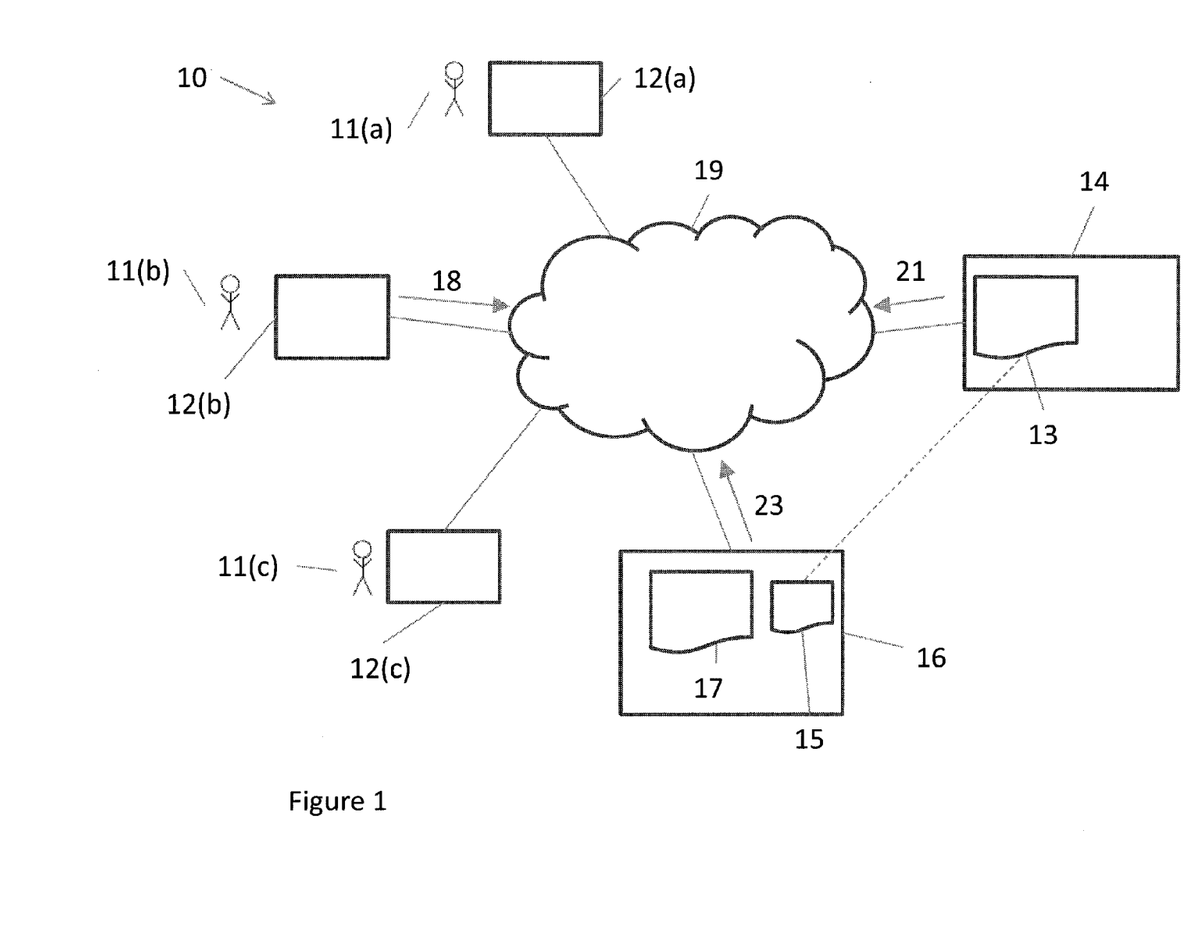
FIG. 1 is a schematic diagram of an electronic environment configured to carry out the improved technique.

FIG. 1 shows an electronic environment 10 which is suitable for use by the improved technique. Electronic environment 10 includes communication medium 19, client computers 12(a), 12(b) and 12(c) [client computers 12], resource server 14 and access control server 16.

Communication medium 19 provides connections between client computers 12, resource server 14 and access control server 16. The communications medium 19 may implement a variety of protocols such as TCP/IP, UDP, ATM, Ethernet, Fibre Channel, combinations thereof, and the like. Furthermore, the communications medium 19 may include various components (e.g., cables, switches, gateways/bridges, NAS/SAN appliances/nodes, interfaces, etc.). Moreover, the communications medium 19 is capable of having a variety of topologies (e.g., hub-and-spoke, ring, backbone, multi-drop, point-to-point, irregular, combinations thereof, and so on).

Client computers 12 are constructed and arranged to run software configured to permit users 11 to send, to resource server 14, a request 18 for access to a resource 13 stored on resource server 14 (e.g., see client computer 12(b)). Client computers 12 can take the form of any machine having a processor which can run the software; examples of such machines are desktop computers, laptop computers, personal digital assistants (PDAs), cell phones, tablet computers and servers. In the examples to follow, client computer 12(b) will send request 18.

Resource server 14 is constructed and arranged to provide access to resource 13. Examples of resources 13 for which a user within the organization may wish to access include, but are not limited to, documents, image files, video files disk drives, VM images and applications.

Request 18 is an electronic signal transmitted from a client computer 12(b) to resource server 14. Request 18 includes a requesting user identifier which identifies user 11(b) sending request 18 from client computer 12(b). Additional information, such as a device ID or an IP address, may also be included within request 18.

Access control server 16 is constructed and arranged to either grant or deny, to user 11(b), access to resource 13. In granting or denying access to resource 13, access control server 16 obtains an access history associated with resource 13 and a security classification associated with user 11(b). The access history provides a listing of the users within the organization who have accessed resource 13. Access control server 16 makes the decision to grant, challenge or deny access based upon the access history and the security classification.

It should be understood that the security classifications associated with user 11(b) include the user's job grade or job description. To this effect, in some arrangements, access control server 16 includes an organization chart 17. Organization chart 17 is a database containing a listing of user identifiers in the organization arranged by their place within a hierarchy which is indicative of job grade. For example, a user holding the title of President or CEO would hold the top place within the hierarchy. Various Vice-Presidents could hold a lower level, while managing directors, middle managers, supervisors and individual contributors would respectively hold still lower levels. To each of these levels, organization chart 17 assigns a number, e.g., "1" to the top level, "2" to the level below the top, and so on. Access control server 16 locates the security classification associated a user by matching a user identifier in a request with that in organization chart 17. Further details of organization chart 17 will be discussed with reference to FIG. 3.

It should be understood that an access history associated with resource 13 includes an access log. To this effect, in further arrangements, access control server 16 stores access log 15 associated with resource 13. Access log 15 is a listing of user identifiers in the organization which are associated with users who have accessed resource 13 in the past. Access log 15 serves as an access history from which access control server 16 forms a list of accessing users who have previously accessed resource 13. In some further arrangements, access log 15 further contains users who have attempted to access resource 15 and were denied access by access control server 16. Further details of access log 15 will be discussed with reference to FIG. 4.

During operation, resource server 14 receives request 18 from client computer 12(b) to access resource 13 on resource server 14. In response to the receipt of request 18, resource server 14 reroutes request 18 to access control server 16, adding information concerning resource 13. Upon receiving request 18, access control server 16 uses information embedded in request 18 to obtain the security classification associated with user 11(b). Access control server 16 then accesses access log 15 associated with resource 13 and obtains the access history associated with resource 13. For example, the access history takes the form of a listing of the users who have previously accessed or attempted to access resource 13. Access control server then uses information embedded with the access history to obtain security classifications of the users who have previously accessed or attempted to access resource 13. Access control server 16 then compares the security classifications of each user who has previously accessed or attempted to access resource 13 to the security classification of requesting user 11(b). Access control server 16 makes a decision 23 to grant, challenge or deny, to user 11(b), access to resource 13 based upon the comparison, whereupon decision 23 is sent to resource server 14.

An advantage of basing decisions to grant or deny, to user 11(b), access to resource 13 based on the comparison of the security classification of the requesting user 11(b) to those of accessing users lies in the fact that the decision 23 to grant, challenge or deny access to resource 13 no longer depends on the opening of each file and reading the data within that file, saving significant processing time. That is, an effective access class of a resource is made dependent on the people in the organization who have accessed the resource. In this way, access policy is shaped automatically by those who create and deploy resources and is enforced by a system in the observations of patterns of access.

It should be understood that, in some arrangements, access control server 16 includes software which performs machine learning algorithms which are based on parameters defining the security classifications of the users who have previously accessed or attempted to access resource 13. Machine learning algorithms can be used to learn individual or aggregate access patterns from access logs for users in the organization chart. The learning module learns from inputs such as a place in a hierarchy of an organization chart and other factors which affect the security classification of previous users. These other factors will be discussed with reference to FIG. 4 below.

It should be understood that possible software configured to permit users 11 to send a request 18 for access to resource 13 to resource server 14 includes, but is not confined to, an internet browser, a remote access port, or a file explorer within an operating system.

Additional details of how access control server 16 produces decision 23 to grant or deny access to resource 13 will be explained below with regard to FIG. 2, FIG. 3 and FIG. 4.

Figure 2:
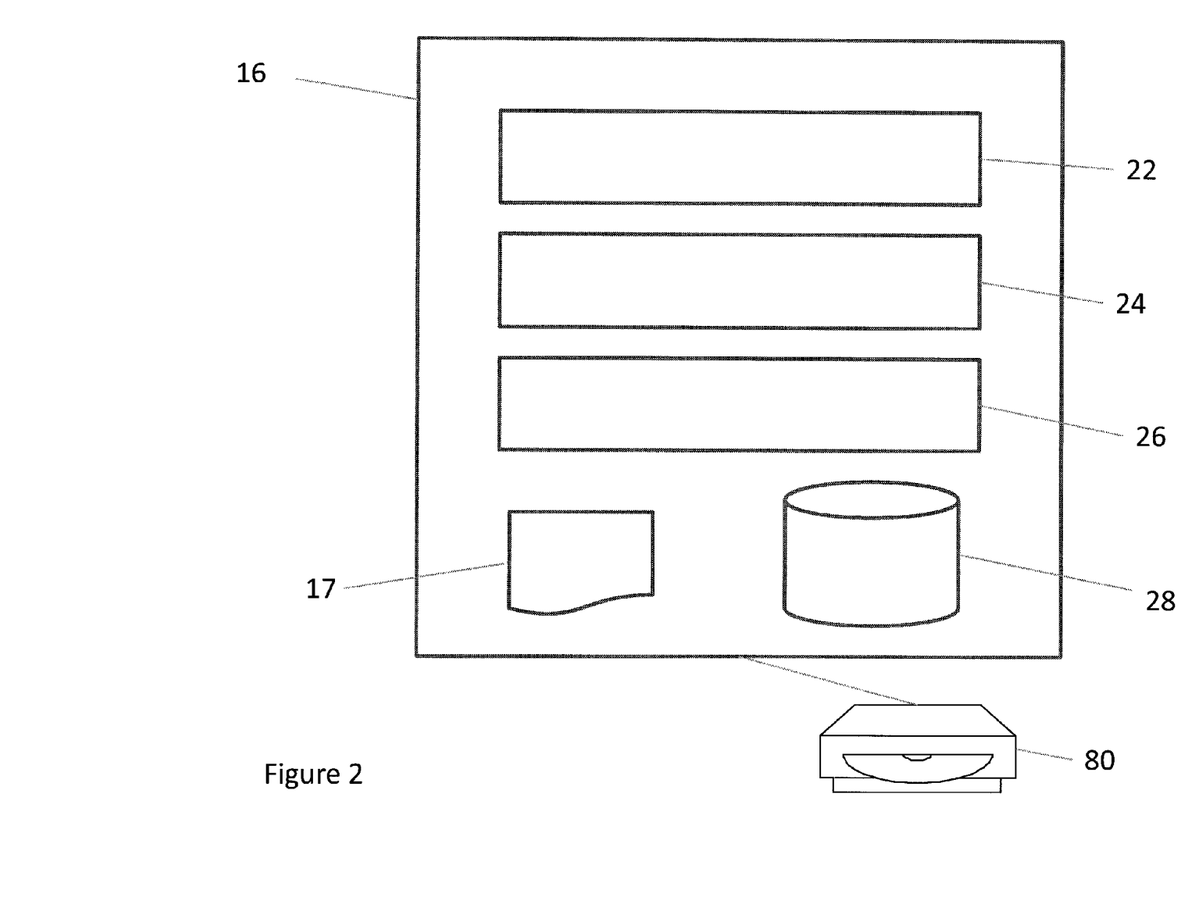
FIG. 2 is a schematic diagram of an access control server for use in the electronic environment of FIG. 1.

FIG. 2 shows further detail of access control server 16. Access control server 16 includes processor 22, memory 24 and network interface 26. In some arrangements, access control server 16 further includes a storage medium 28.

Memory 24 is configured to store a computer program 80 which is constructed and arranged to control access to resource 13. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the computer program 80 stored in memory 24.

Network interface 26 is configured to receive request 18 from client computer 12(b). Network interface 26 is further configured to send decision 21 to grant, challenge or deny, to user 11(b), access to resource 13 to resource server 14.

Storage medium 28 is constructed and arranged to store a database of access logs, each access log 15 associated with a resource 13. In some arrangements, storage medium 28 is further constructed and arranged to store organization chart 17.

Figure 3:
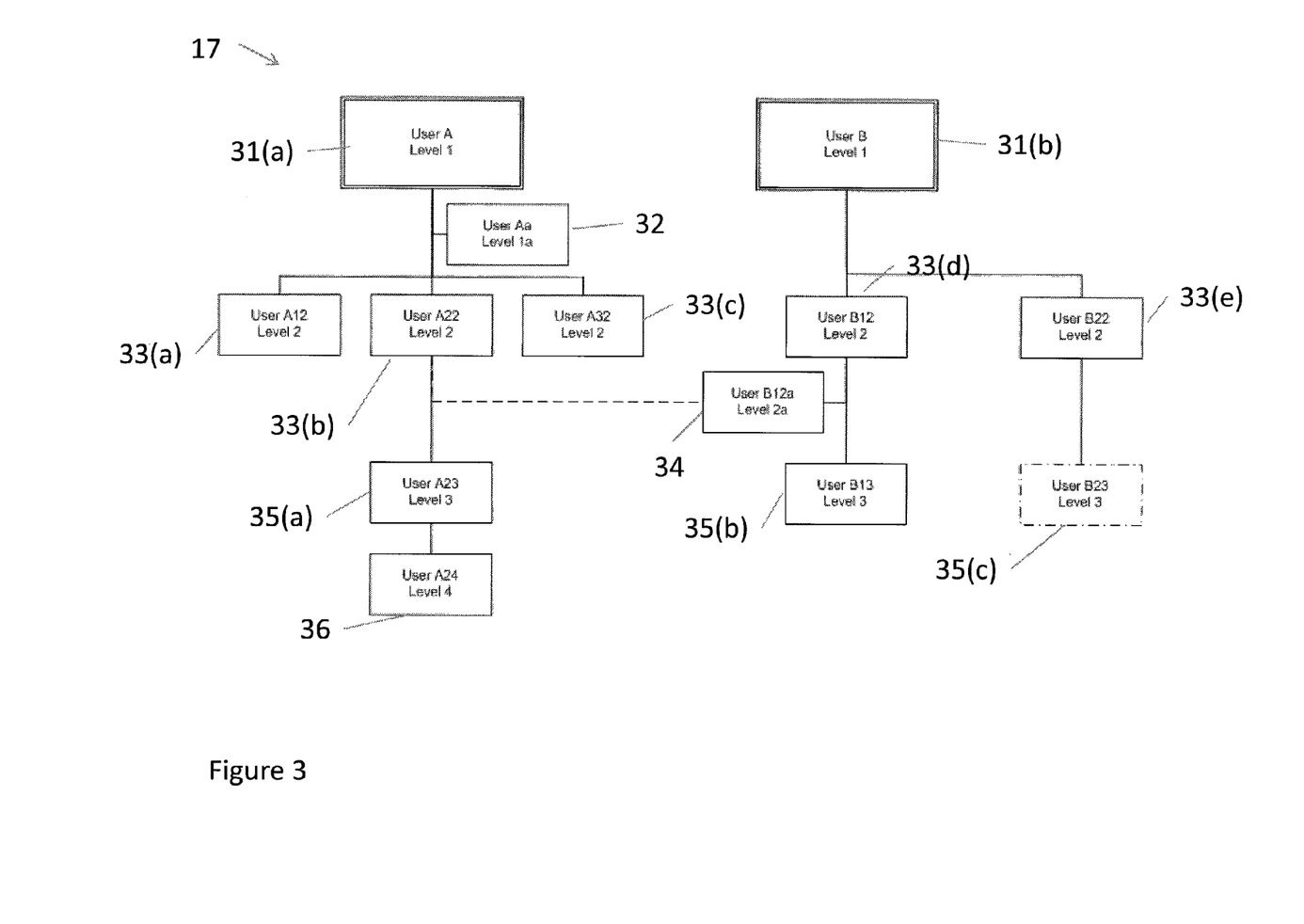
FIG. 3 is a diagram representing an organization chart which is stored on the access control server of FIG. 2.

FIG. 3 shows further details of an example of organization chart 17. In organization chart 17 are representations of employees within the organization and their reporting hierarchies. For example, Blocks 31(a) and 31(b) [blocks 32] correspond to user identifiers User A and User B, respectively, and represent two users at the top of the organization's hierarchy. These user identifiers are assigned a hierarchal level 1. Blocks 33(a), 33(b), 33(c), 33(d) and 33(e) [blocks 33] have user identifiers User A12, User A22, User A32, User B12 and User B22, respectively. Users having user identifiers User A12, User A22 and User A32 directly report to User A and are assigned a hierarchal level 2; users having user identifiers User B12 and User B22 directly report to the user having user identifier User B and are also assigned a hierarchal level 2. Blocks 35(a), 35(b) and 35(c) [blocks 35] correspond to users having user identifiers A23, B13 and B23, respectively and are assigned a hierarchal level 3. Block 36 corresponds to the user having user identifier A24 and is assigned a hierarchal level 4.

In some arrangements, organization chart 17 distinguishes between types of employees. For example, Block 32 corresponds to the user having user identifier Aa and is representative of a secretarial or administrative assistant position. In some organizations, such a user would have access to the same resources as User A with the exception of certain personnel files. Another administrative assistant in Block 34, corresponding to the user with user identifier B12a, reports directly to the user with user identifier B12. This administrative assistant, however, has a dotted line relation to the user with user identifier A22. This could imply that this administrative assistant has access to the same resources as the user with user identifier B12 and some access to the resources which the user with user identifier B12 has. As another example, Block 35(c) corresponds to a user having user identifier User B23 and is representative of a consultant who may not be a full-time employee of the organization. In some organizations, such a user would be denied access to certain resources for which access other users having the same hierarchal level, say the user having user identifier B13, would be granted.

In some arrangements, organization chart 17 further identifies a department or group to which a user belongs. In the example organization chart 17, users having user identifiers with an "A", e.g., User A, User A12, etc., would correspond to a Department A, while users having user identifiers with a "B" would correspond to Department B. The "A" and the "B" in the user identifiers server as department identifiers which, in addition to the hierarchal level, can be used to further determine the decision to grant, challenge or deny access to resource 13.

Suppose that the user with user identifier User B23 send request 18 to access resource 13 on resource server 14. Access control server 16, upon receiving request 18, extracts user identifier User B23 from request 18. Access control server 16 then looks up user identifier B23 in organization chart 17 and assigns values of hierarchal level 3 and department identifier B to a variable in memory 24, which variable includes a value of user identifier B23. In some arrangements, a flag within the variable in memory 24 is set to represent the fact that user identifier B23 corresponds to a consultant rather than a full-time employee. Access control server 16 then obtains access log 15 associated with resource 13, details of which are explained with reference to FIG. 4.

Figure 4:
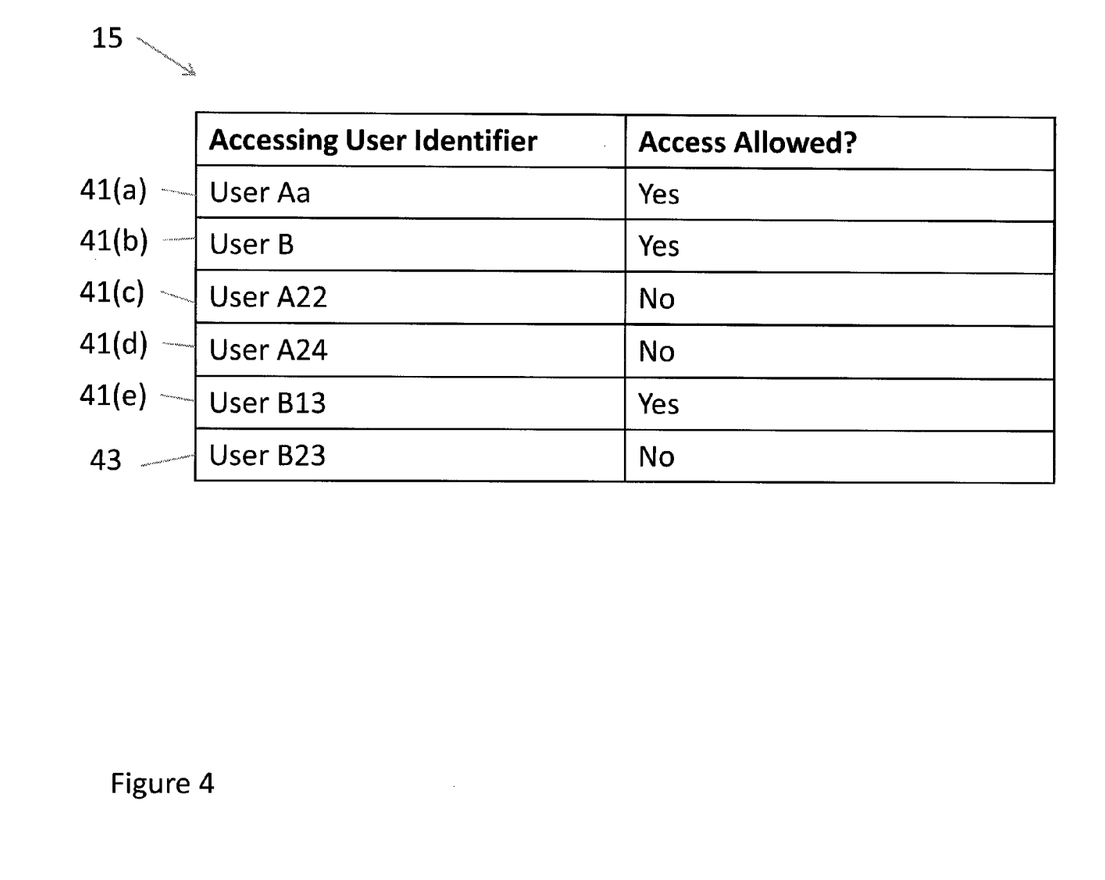
FIG. 4 is a diagram representing an access control log which is stored on the access control server of FIG. 2.

FIG. 4 shows further details of an example of access log 15. Access log 15 includes entries 41(a), 41(b), 41(c), 41(d) and 41(e) [entries 41] with each entry containing a user identifier associated with a user who has either accessed or attempted to access resource 13. In some arrangements, each entry in access log 15 further contains a flag corresponding to whether access was granted or denied to the user having the user identifier in the entry. For example, entry 41(a) denotes that the user with user identifier User Aa was granted access to resource 13. Alternatively, entry 41(a) can denote that the user with user identifier User Aa created resource 13. Entry 41(b) denotes that the user with user identifier User B was granted access to resource 13. Entries 41(c) and 41(d) denote that the users with user identifiers User A22 and A24 were denied access to resource 13. Entry 41(e) denotes that the user with user identifier User B13 was granted access to resource 13.

In some further arrangements, a further flag can be used to denote whether a granted or denied access was attained through a challenge.

Access control server 16 forms a list of the user identifiers in access log 15 and looks up values of hierarchal level and department identifier for each user identifier in organization chart 17. Upon looking up the values of hierarchal level and department identifier for each user identifier, access control server 16 stores each set of values of hierarchal level and department identifier in an array element in memory 24. In some arrangements, access control server further stores an access flag denoting whether access was denied or granted within each array element.

Once the values of hierarchal level and department identifier are stored in memory 24, access control server 16 runs code containing instructions on processor 22 to compare the values of hierarchal level 3 and department identifier B in the variable stored in memory 24 to the value of hierarchal level and department identifier in each array element stored in memory 24. In some arrangements, processor 22 computes a risk score based on the comparing performed by processor 22 over each array element, which risk score being indicative of a security risk in granting access to resource 13. For example, a higher value of the risk score is indicative of a greater security risk associated with providing, to user 11(b), access to resource 13. In some arrangements, a certain range of risk scores would result in a challenge to the request 18 for access to resource 13. A risk score resulting in a challenge to the user would fall below a score above which access would be granted and above a score below which access would be denied. For example, such a challenge can take the form of a challenge question which someone who would be granted access to resource 13 would be able to answer correctly.

In other arrangements, the generation of the risk score includes changing the value of risk score based on a proximity measure of the values of the hierarchal level and department identifier associated with user 11(b) and stored in the variable in memory 24 to values of the hierarchal level and department identifier associated with an accessing user and stored in an array element in memory 24. An example of a proximity measure is an $L^2$ metric, although other proximity measures are possible.

To continue the above example, based upon the values of the hierarchal level and department identifier associated with user 11(b) and the values of the hierarchal level, department identifier, and access flag stored in each array element in memory 24, processor 22 generates a risk score. For the values presented in FIG. 4, access control server 16 generates a decision based on the generated risk score to deny access, to user 11(b), access to resource 13.

Upon generating the decision, network interface 26 sends a signal 23 to resource server 14 which contains the result of the decision. In some arrangements, access control server 16 further writes into an entry 43 in access log 15 the result of the decision. The advantage of writing the decision into the entry in access log 15 is that the electronic environment 10 becomes a learning environment, able to adapt to changing conditions. In further arrangements, access control server 16 includes machine learning software from which the generation of the risk score adapts to new users and changes in organization chart 17. Machine learning software is ultimately useful in generating a rules set for making a decision to grant, challenge or deny an arbitrary request for access to the resource.

Machine learning software includes algorithms which can be used to learn individual or aggregate access patterns from access logs for users in the organization chart. A machine learning module within the software learns from factors such as a place in a hierarchy of an organization chart, department identifier which affect the security classification of previous users and number of failed access attempts. In addition to these factors, other factors which can serve as input into the machine learning module include geo locations of accessing users, elapsed time since a previous access, number of users requesting access within a given department in a given time period.

The machine learning algorithms used to carry out machine learning take the form of an artificial neural network (ANN) although other models are possible. In an ANN, factors from the previous users become into training data which determine "neurons" of the ANN. An error function which measures a distance between the input and some expected output is used in the determination of the neurons as well as classifying inputs into a trained ANN. In an unsupervised learning paradigm, an autoassociative ANN uses positive data (i.e., factors from users who were granted access) as input values and the error function measures the distance between the input values and output values. Other learning paradigms for ANNs, such as supervised and reinforcement, are also possible.

Figure 5:
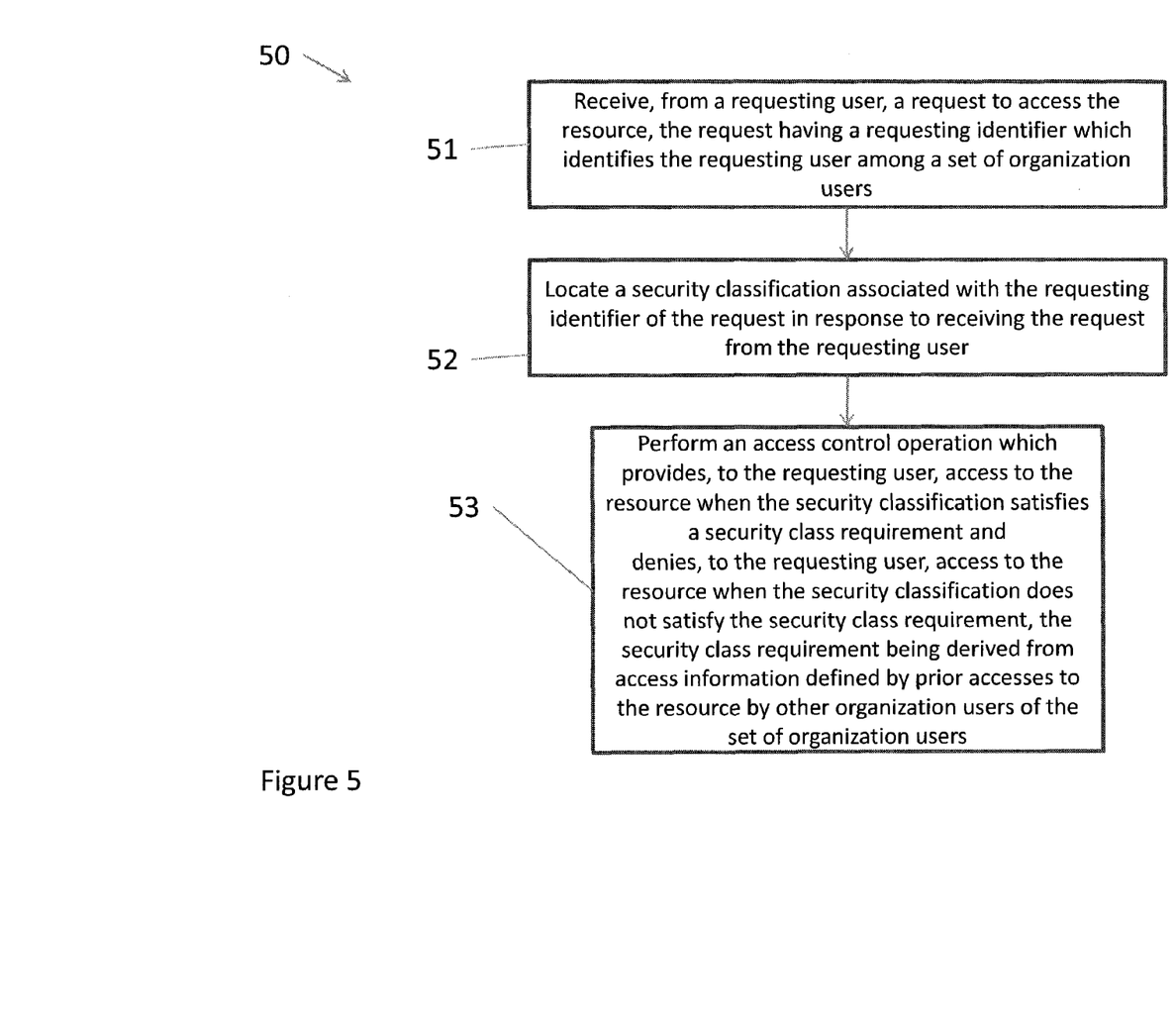
FIG. 5 is a flow chart illustrating a method of carrying out the improved technique within the electronic environment of FIG. 1.

FIG. 5 shows a method 50 for carrying out the improved technique. In step 51, a request to access a resource is received, the request having a requesting identifier which identifies the requesting user among a set of organization users. In step 52, a security classification associated with the requesting identifier of the request is located in response to receiving the request from the requesting user. In step 53, an access control operation is performed which provides, to the requesting user, access to the resource when the security classification satisfies a security class requirement and denies, to the requesting user, access to the resource when the security classification does not satisfy the security class requirement, the security class requirement being derived from access information defined by prior accesses to the resource by other organization users of the set of organization users.

While various embodiments of the invention have been particularly shown and described, it will be understood by those skilled in the art that various changes in form and details may be made therein without departing from the spirit and scope of the invention as defined by the appended claims.

For example, access log 15 may be stored on resource server 14 rather than access control server 16.

In a further example, client computer 12(b) sends request 18 directly to access control server 16. Alternatively, resource server 14 sends, upon receipt of request 18 directly from client computer 12(b), a signal 21 to access control server 16, the signal containing further information concerning resource 13.

It should be understood that communication medium 19 is constructed and arranged to convey electronic signals 18, 21 and 23 between the various components of electronic environment 10 to enable the components to communicate effectively and efficiently. Along these lines, electronic signals 18, 21 and 23 can take a variety of forms including electrical signals, optical signals, wireless signals, combinations thereof and so on.

It should also be understood that there are situations in which a top-ranking executive does not have a security classification which allows the executive access to all resources.

It should also be understood that other machine learning models are possible in bringing about a machine learning paradigm to determining whether to grant or deny access to a resource. Other models include decision tree learning, association rule learning, genetic programming, inductive logic programming, support vector machines, hierarchal clustering and Bayesian network. Learning paradigms supported by these other models include supervised learning, unsupervised learning, semi-supervised learning, reinforcement learning, transduction and learning to learn.

Furthermore, it should be understood that some embodiments are directed to an electronic environment which utilizes systems that controls access to a resource on a resource server. Some embodiments are directed to access control server 16. Some embodiments are directed to a system which controls access to a resource on a resource server. Some embodiments are directed to a process of controlling access to a resource on a resource server. Also, some embodiments are directed to a computer program product which enables computer logic to perform the control of access to a resource on a resource server.

In some arrangements, access control server 16 is implemented by a set of processors or other types of control/processing circuitry running software. In such arrangements, the software instructions can be delivered to access control server 16 in the form of a computer program product 80 (illustrated generally by a diskette icon 80 in FIG. 2) having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. A computer-implemented method of controlling access to a resource, the method comprising:
    receiving at a computer having a processor, from a requesting user, a request to access the resource, the request having a requesting identifier which identifies the requesting user among a set of organization users;
    locating, by the processor, a security classification associated with the requesting identifier of the request in response to receiving the request from the requesting user; and
    performing, by the processor, an access control operation which:
        provides, to the requesting user, access to the resource when the security classification satisfies a security class requirement; and
        denies, to the requesting user, access to the resource when the security classification does not satisfy the security class requirement, the security class requirement being derived from access information defined by prior accesses to the resource by other organization users of the set of organization users;
    wherein the security classification associated with the requesting identifier is based upon an organization chart, the organization chart including a set of hierarchal levels and a set of organization identifiers, each organization identifier of the set of organization identifiers being associated with an organization user of the set of organization users, each organization identifier being associated with a hierarchal level of the set of hierarchal levels;
    wherein the requesting identifier includes a value of a requesting hierarchal level; and
    wherein locating the security classification includes:
        matching the requesting identifier to an organization identifier of the set of organization identifiers; and
        setting the value of the requesting hierarchal level equal to a value of the hierarchal level with which the matched organization identifier is associated.

2. A method as in claim 1, wherein the resource is associated with an access log, the access log including a set of access log entries, each access log entry of the set of access log entries including an accessing identifier of a set of accessing identifiers, each accessing identifier corresponding to an accessing user of a set of accessing users, each accessing user belonging to the set of organization users each access log entry associated with a prior access to the resource by the accessing user with which the accessing identifier in the access log entry is associated;
    wherein the method further comprises:
        prior to performing the access control operation:
            collecting the set of access log entries from the access log associated with the resource; and
            deriving the security class requirement based on the set of access log entries.

3. A method as in claim 2, wherein deriving the security class requirement includes:
    defining an accessing hierarchal level array having elements, the accessing hierarchal level array associated with the access log, each element associated with an accessing identifier of an access log entry of the set of access log entries;
    for each accessing identifier:
        matching the accessing identifier to an organization identifier; and
        setting a value of the element of the accessing hierarchal level array associated with the accessing identifier to a value of the hierarchal level with which the matched organization identifier is associated.

4. A method as in claim 3, wherein performing the access control operation includes:
    comparing the value of the requesting hierarchal level with the value of each element of the accessing hierarchal level array; and
    generating a risk score based on the comparing, a higher value of the risk score indicative of a greater security risk associated with providing, to the requesting user, access to the resource.

5. A method as in claim 3, wherein the organization chart further includes a set of department identifiers, each organization identifier being further associated with a department identifier of the set of department identifier;
    wherein the requesting identifier further includes a requesting department identifier;
    wherein locating the security classification further includes:
        setting the requesting department identifier equal to the department identifier with which the matched organization identifier is associated.

6. A method as in claim 5, wherein deriving the security class requirement further includes:
    defining an accessing department identifier array having elements, the accessing department identifier array associated with the access log, each element associated with an accessing identifier of an access log entry of the set of access log entries;
    for each accessing identifier:
        matching the accessing identifier to an organization identifier; and
        setting the element of the accessing department identifier array associated with the accessing identifier to the department identifier with which the matched organization identifier is associated.

7. A method as in claim 6, wherein performing the access control operation includes:
    comparing the value of the requesting hierarchal level with the value of each element of the accessing hierarchal level array and the requesting department identifier with each element of the accessing department identifier array; and
    generating a risk score based on the comparing, a higher value of the risk score indicative of a greater security risk associated with providing, to the requesting user, access to the resource.

8. A method as in claim 7, wherein a result of a request to access the resource from a user from the set of organization users is selected from the group which includes success and failure, success being defined as the user being provided access to the resource and failure being defined as the user being denied access to the resource;
    wherein the method further comprises:
        recording, in the access log associated with the resource, the result of the request to access the resource from the requesting user.

9. A method as in claim 8, wherein parameters associated with the requests to access the resource recorded in the access log are used as training data for an artificial neural network (ANN) model, the ANN model used to develop rules for deciding whether to grant or deny access to arbitrary requests to access the resource.

10. A method as in claim 8, wherein each access log entry of the set of access log entries further includes a recording of a result of a request to access the resource from the accessing user of the access log entry;
   wherein generating the risk score based on the comparing includes:
      decreasing the risk score based on a proximity measure of the requesting user to users from the set of accessing users with a recording of a success in the access log entry which includes the accessing identifier of the accessing user; and
      increasing the risk score based on a proximity measure of the requesting user to users from the set of accessing users with a recording of a failure in the access log entry which includes the accessing identifier of the accessing user.

11. A method as in claim 10, wherein performing an access control operation further includes:
   challenging, to the user, access to the resource when the generated risk scores falls below a score above which request to the resource is granted and above a score below which access to the resource is denied.

12. A system for controlling access to a resource, the system comprising:
   a network interface connected to a network;
   a memory; and
   a processor coupled to the memory, the processor constructed and arranged to:
      receive, from a requesting user, a request to access the resource, the request having a requesting identifier which identifies the requesting user among a set of organization users;
      locate a security classification associated with the requesting identifier of the request in response to receiving the request from the requesting user; and
      perform an access control operation which:
         provides, to the requesting user, access to the resource when the security classification satisfies a security class requirement; and
         denies, to the requesting user, access to the resource when the security classification does not satisfy the security class requirement, the security class requirement being derived from access information defined by prior accesses to the resource by other organization users of the set of organization users;
      wherein the security classification associated with the requesting identifier is based upon an organization chart, the organization chart including a set of hierarchal levels and a set of organization identifiers, each organization identifier of the set of organization identifiers being associated with an organization user of the set of organization users, each organization identifier being associated with a hierarchal level of the set of hierarchal levels;
      wherein the requesting identifier includes a value of a requesting hierarchal level; and
      wherein locating the security classification includes:
         matching the requesting identifier to an organization identifier of the set of organization identifiers; and
         setting the value of the requesting hierarchal level equal to a value of the hierarchal level with which the matched organization identifier is associated.

13. A system as in claim 12, wherein the resource is associated with an access log, the access log including a set of access log entries, each access log entry of the set of access log entries including an accessing identifier of a set of accessing identifiers, each accessing identifier corresponding to an accessing user of a set of accessing users, each accessing user belonging to the set of organization users, each access log entry associated with a prior access to the resource by the accessing user with which the accessing identifier in the access log entry is associated;
   wherein the processor is further configured to:
      prior to performing the access control operation:
         collect the set of access log entries from the access log associated with the resource; and
         derive the security class requirement based on the set of access log entries.

14. A system as in claim 13, wherein deriving the security class requirement includes:
   defining an accessing hierarchal level array having elements, the accessing hierarchal level array associated with the access log, each element associated with an accessing identifier of an access log entry of the set of access log entries;
   for each accessing identifier:
      matching the accessing identifier to an organization identifier; and
      setting a value of the element of the accessing hierarchal level array associated with the accessing identifier to a value of the hierarchal level with which the matched organization identifier is associated.

15. A system as in claim 13, wherein the organization chart further includes a set of department identifiers, each organization identifier being further associated with a department identifier of the set of department identifier;
   wherein the requesting identifier further includes a requesting department identifier;
   wherein locating the security classification further includes:
      setting the requesting department identifier equal to the department identifier with which the matched organization identifier is associated.

16. A system as in claim 15, wherein deriving the security class requirement further includes:
   defining an accessing department identifier array having elements, the accessing department identifier array associated with the access log, each element associated with an accessing identifier of an access log entry of the set of access log entries;
   for each accessing identifier:
      matching the accessing identifier to an organization identifier; and
      setting the element of the accessing department identifier array associated with the accessing identifier to the department identifier with which the matched organization identifier is associated.

17. A computer program product having a non-transitory computer readable storage medium which stores code to control access to a resource within an organization, the code including instructions to:
   receive, from a requesting user, a request to access the resource, the request having a requesting identifier which identifies the requesting user among a set of organization users;
   locate a security classification associated with the requesting identifier of the request in response to receiving the request from the requesting user; and
   perform an access control operation which:

provides, to the requesting user, access to the resource when the security classification satisfies a security class requirement; and denies, to the requesting user, access to the resource when the security classification does not satisfy the security class requirement, the security class requirement being derived from access information defined by prior accesses to the resource by other organization users of the set of organization users;

wherein the security classification associated with the requesting identifier is based upon an organization chart, the organization chart including a set of hierarchal levels and a set of organization identifiers, each organization identifier of the set of organization identifiers being associated with an organization user of the set of organization users, each organization identifier being associated with a hierarchal level of the set of hierarchal levels;

wherein the requesting identifier includes a value of a requesting hierarchal level; and wherein locating the security classification includes:
matching the requesting identifier to an organization identifier of the set of organization identifiers; and
setting the value of the requesting hierarchal level equal to a value of the hierarchal level with which the matched organization identifier is associated.

18. A computer program product as in claim 17, wherein the resource is associated with an access log, the access log including a set of access log entries, each access log entry of the set of access log entries including an accessing identifier of a set of accessing identifiers, each accessing identifier corresponding to an accessing user of a set of accessing users, each accessing user belonging to the set of organization users each access log entry is associated with a prior access to the resource by the accessing user with which the accessing identifier in the access log entry is associated;

wherein the code includes further instructions to:
prior to performing the access control operation:
collect the set of access log entries from the access log associated with the resource; and
derive the security class requirement based on the set of access log entries.

19. A method as in claim 4, wherein setting the value of the element of the accessing hierarchal level array associated with the accessing identifier to a value of the hierarchal level with which the matched organization identifier is associated includes:

generating a flag having a value that indicates whether the accessing user to which the accessing identifier corresponds is a full-time employee or a consultant to the organization, the flag corresponding to the element of the accessing hierarchal level array;

wherein performing the access control operation includes:
for each other element of the accessing hierarchal level array, comparing the value of the flag corresponding to the element of the accessing hierarchal level array with the value of flag corresponding to the other element of the accessing hierarchal level array.

20. A method as in claim 19, wherein generating the risk score includes:

increasing the risk score when the value of the flag corresponding to the element of the accessing hierarchal level array indicates that the accessing user is a consultant, and decreasing the risk score when the value of the flag corresponding to the element of the accessing hierarchal level array indicates that the accessing user is a full-time employee.

* * * * *